United States Patent
Chapman

(10) Patent No.: US 11,433,575 B2
(45) Date of Patent: Sep. 6, 2022

(54) CHARGE SHAPING SYSTEM AND APPARATUS

(71) Applicant: The Boeing Company, Chicago, IL (US)

(72) Inventor: Michael R. Chapman, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 748 days.

(21) Appl. No.: 16/420,662

(22) Filed: May 23, 2019

(65) Prior Publication Data

US 2020/0346376 A1 Nov. 5, 2020

Related U.S. Application Data

(62) Division of application No. 15/071,511, filed on Mar. 16, 2016, now Pat. No. 10,328,616.

(51) Int. Cl.
| | |
|---|---|
| *B29C 43/20* | (2006.01) |
| *B29C 70/34* | (2006.01) |
| *B29L 9/00* | (2006.01) |

(52) U.S. Cl.
CPC .......... *B29C 43/203* (2013.01); *B29C 70/34* (2013.01); *B29L 2009/00* (2013.01)

(58) Field of Classification Search
CPC ......... B29C 70/46; B29C 70/44; B29C 70/38; B29C 70/541; B29C 70/40; B29C 43/203; B29C 70/34; B29L 2009/00
See application file for complete search history.

(56) References Cited

U.S. PATENT DOCUMENTS

| | | | |
|---|---|---|---|
| 3,704,883 A | 12/1972 | Don | |
| 4,720,255 A | 1/1988 | Mittelstadt | |
| 6,814,916 B2 | 11/2004 | Willden et al. | |
| 7,651,650 B2 | 1/2010 | Willden et al. | |
| 8,597,015 B2 | 12/2013 | Henderson | |
| 2010/0295240 A1 | 11/2010 | Brewer, III et al. | |
| 2012/0006475 A1* | 1/2012 | Colombo | B29C 70/504 156/243 |
| 2013/0221568 A1* | 8/2013 | Shindo | B29C 70/38 264/258 |
| 2017/0266852 A1 | 9/2017 | Chapman | |

(Continued)

FOREIGN PATENT DOCUMENTS

| | | |
|---|---|---|
| DE | 102010015027 A1 | 10/2011 |
| DE | 102014209904 A1 | 11/2015 |

(Continued)

OTHER PUBLICATIONS

Pham, "Method and Apparatus for Forming Contoured Stiffeners," U.S. Appl. No. 14/747,301, filed Jun. 23, 2015, 55 pages.

(Continued)

*Primary Examiner* — Nahida Sultana
(74) *Attorney, Agent, or Firm* — Yee & Associates, P.C.

(57) ABSTRACT

A composite charge is positioned onto lower plates of a plurality of placement end effectors. Upper plates of the plurality of placement end effectors are rotated along a first axis to cover the composite charge. The composite charge is contoured to a tool using the plurality of placement end effectors to form a contoured composite charge. The contoured composite charge is compacted using a roller.

20 Claims, 9 Drawing Sheets

(56) References Cited

U.S. PATENT DOCUMENTS

2019/0070772 A1\* 3/2019 Stone .................. B29C 70/38
2020/0139647 A1\* 5/2020 Shaw ................... B29C 70/388
2020/0156289 A1\* 5/2020 With Møller .......... B25B 5/006
2020/0180243 A1\* 6/2020 Okamoto ............... B29C 43/44
2021/0107169 A1\* 4/2021 Velasquez ............. B29C 31/08

FOREIGN PATENT DOCUMENTS

EP          62991 B1    9/1986
JP      2005219373 A    8/2005

OTHER PUBLICATIONS

Extended European Search Report, dated Jul. 18, 2017, regarding Application No. 17156607.8, 8 pages.
Office Action dated May 7, 2018 regarding U.S. Appl. No. 15/071,511, 15 pages.
Final Office Action dated Oct. 25, 2018 regarding U.S. Appl. No. 15/071,511, 8 pages.
Notice of Allowance, dated Feb. 8, 2019 regarding U.S. Appl. No. 15/071,511, 9 pages.

\* cited by examiner

CHARGE SHAPING SYSTEM AND APPARATUS

CROSS-REFERENCE TO RELATED APPLICATIONS

This application is a divisional of U.S. patent application Ser. No. 15/071,511, filed Mar. 16, 2016, which is incorporated by reference herein in its entirety.

BACKGROUND INFORMATION

1. Field

The present disclosure relates generally to manufacturing composite assemblies and, in particular, to forming composite stringers. Still more particularly, the present disclosure relates to a method and apparatus for laying up composite plank stringers.

2. Background

Aircraft are being designed and manufactured with greater and greater percentages of composite materials. For example, composite materials are used in aircraft to decrease the weight of the aircraft. This decreased weight improves performance features such as payload capacity and fuel efficiency. Further, composite materials provide longer service life for various components in an aircraft.

Composite materials are tough, light-weight materials created by combining two or more functional components. For example, a composite material includes reinforcing fibers bound in a polymer resin matrix. Resins used in composite materials include thermoplastic or thermoset resins. The fibers may be unidirectional or may take the form of a woven cloth or fabric.

In manufacturing composite structures, layers of composite material are typically laid up on a tool. The layers include fibers in sheets. These sheets may take the form of fabrics, tape, tows, or other suitable forms. In some cases, resin is infused or preimpregnated into the sheets. These types of sheets are commonly referred to as prepreg. The different layers of prepreg may be laid up in different orientations, and different numbers of layers are used depending on the performance requirements of the composite structure being manufactured.

Some types of structures are currently being laid up manually. As one example, some currently available composite structures for aircraft are laid up manually by human operators. However, building a composite structure manually can be more time-consuming than desired. Further, this type of manual assembly process can be more complex than desired. Still further, manually laying up composite structures may not provide the level of quality and consistency desired for composite structures.

Consequently, it may be desirable to automate portions of the assembly process using robotic systems. However, using conventional robotic systems to lay up some composite structures may be more difficult than desired. Currently available methods and systems for using robotic systems to lay up composite material may not provide the level of quality or consistency that is desired.

SUMMARY

An embodiment of the present disclosure provides a method. A composite charge is positioned onto lower plates of a plurality of placement end effectors. Upper plates of the plurality of placement end effectors are rotated along a first axis to cover the composite charge. The composite charge is contoured to a tool using the plurality of placement end effectors to form a contoured composite charge. The contoured composite charge is compacted using a roller.

Another embodiment of the present disclosure provides a charge shaping system. The charge shaping system comprises a plurality of towers, a plurality of placement end effectors, and a contoured transfer tool. Each of the plurality of placement end effectors is associated with one of the plurality of towers.

Yet another embodiment of the present disclosure provides an apparatus. The apparatus comprises an extension, a rotation mechanism attached to the extension and rotatable about a second axis, a lower plate associated with the rotation mechanism, and an upper plate rotatable relative to the lower plate about a first axis.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
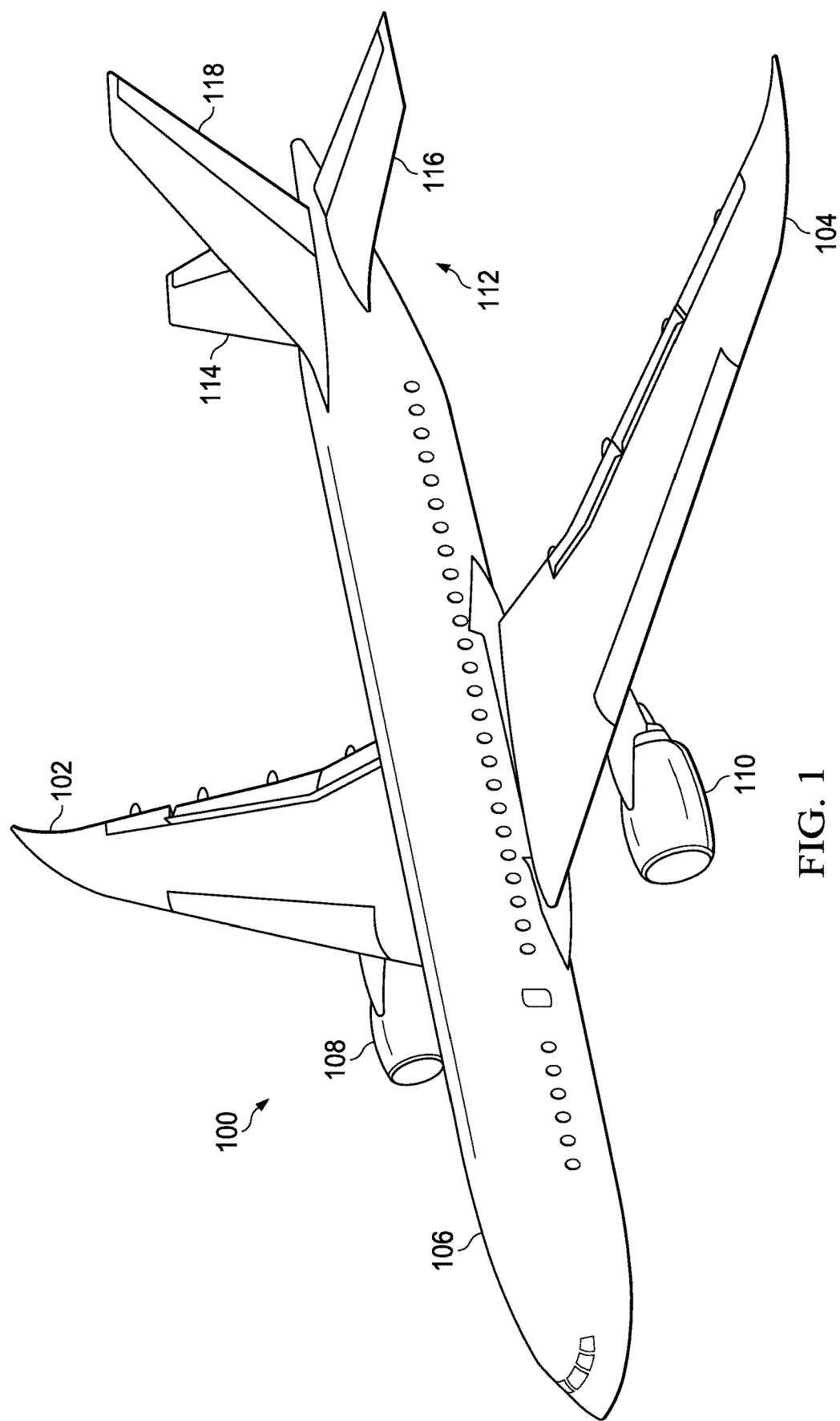
FIG. 1 is an illustration of an aircraft in which an illustrative embodiment may be implemented.

The different illustrative embodiments recognize and take into account one or more different considerations. For example, the illustrative embodiments recognize and take into account that forming desirable cross-sections for stringers may be undesirably difficult using conventional techniques. For example, in current techniques, a composite stack is formed, cured, and then machined. However, some angles and radii can be undesirably difficult to create using this process. Further, this process may produce components with an undesirable quality. Yet further, the composite stack is not desirably machined prior to curing.

The embodiments described herein provide a method and apparatus for automating stacked assembly of structures. Stacked assembly includes applying layers of material onto each other to form a stack. The structures include a number of stringers. As used herein, "a number of" when used with reference to items means one or more items. For example, a number of stringers includes one or more stringers. In some illustrative examples, the stringers are referred to as non-interleaved planked solid composite lamina stringer sectional assemblies. Non-interleaved planked solid composite lamina stringer sectional assemblies include stringers that are placed directly on the top of a wing skin and not built up as part of the wing skin. More specifically, the method automates stacking lamina assembly of a predetermined number of ply lamination groupings indexed to a contoured tool and a uniform centerline. The number of ply lamination groupings may also be referred to as a number of charges or a number of composite charges. When assembled, the charges form a solid, variable gage, composite lamina stringer sectional build-up assembly to a specific contour.

During manufacturing, single lamina plies, which make up a charge, are laid up to form a charge. Charges are then cut in a predetermined manner. In some illustrative examples, the predetermined manner includes using at least one of ultrasonic automated methods, laser methods, or other desirable methods. The charges are transferred one at a time to a charge shaping system that includes spaced-apart placement towers and associated placement end effectors.

One end of the charge is first indexed to the tool and any previously laid up plies, then restrained. Using a coordinated movement of 3-axis motion, the end effectors lower the charge towards the surface of the contoured tool, all but the first end effectors allowing the charge to slide lengthwise to accommodate the change in length between towers brought on by contouring.

A charge is centered by the placement end effectors then held over a contoured tool and aligned to the contoured tool's centerline axis. The charge is centered by plates of the placement end effectors. In a uniform sequenced motion, the end effectors are activated to center the charge relative to the contoured tool. The end effectors also confine further motion of the charge relative to the centerline axis. The placement of charges is repeated to obtain the desired total thickness detail of the structure. The charges are positioned to form a predetermined cross-sectional contour or gage change along the length of the structure.

After placing the charges, a compactive roller force is applied. In some illustrative examples, the compactive roller force is started from the fixed or pre-indexed end of the structure and rolled to the opposite end. The roller force de-bulks the inner laminar voids that may occur during assembly. In some examples, the compactive roller force is applied after each charge is positioned. In some other examples, the compactive roller force is applied after all charges have been positioned. Plates of the placement end effectors are retracted just before the roller gets to them to maintain centerline.

With reference now to the figures, and in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having composite components laid up using a charge shaping system in accordance with an illustrative embodiment. For example, composite plank stringers may be present in at least one of wing 102 or wing 104 of aircraft 100.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, or other suitable types of aircraft.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, or a space-based structure. More specifically, the platform may be a surface ship, a tank, a personnel carrier, a train, a spacecraft, a space station, a satellite, a submarine, an automobile, a manufacturing facility, a building, or other suitable platforms.

Figure 2:
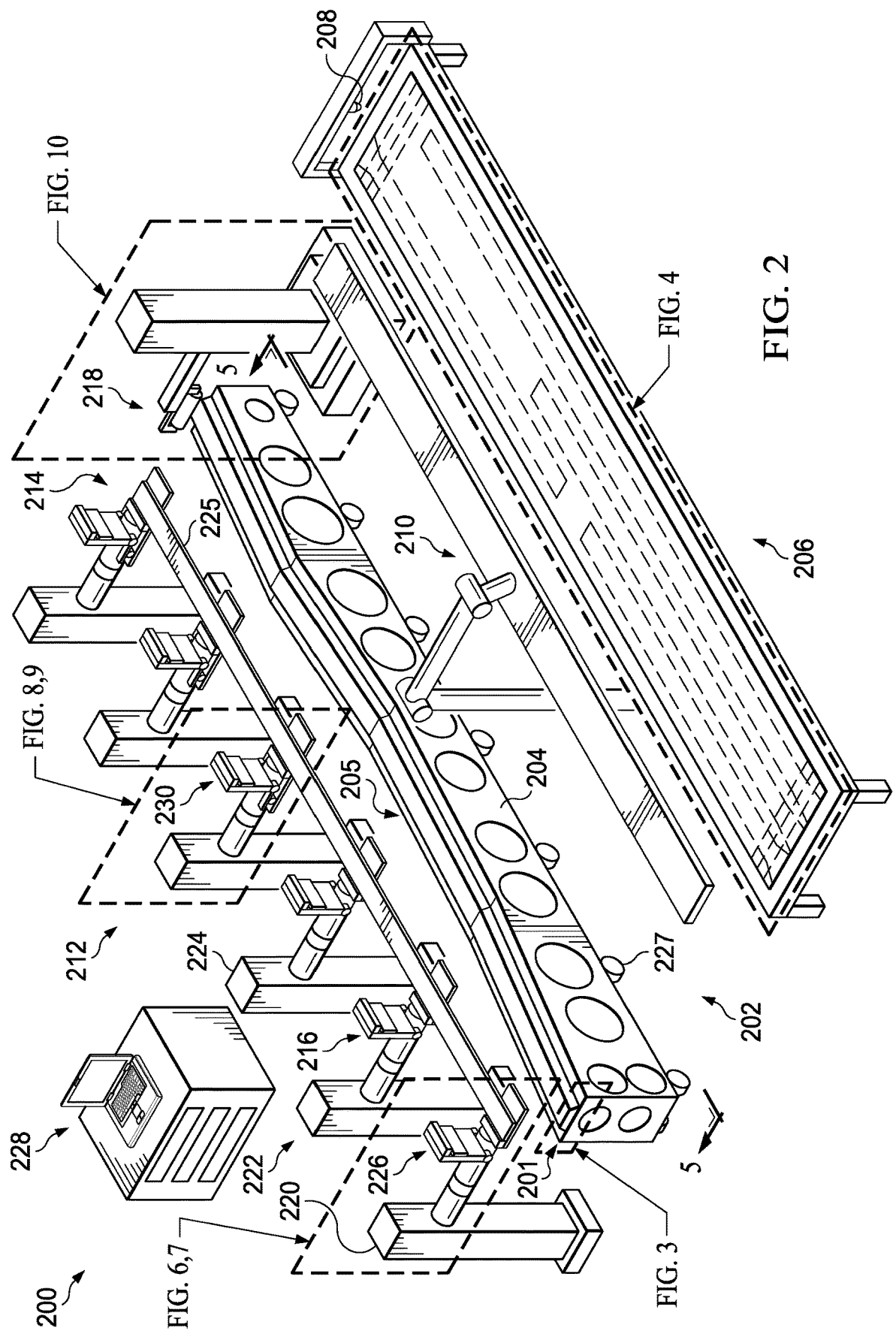
FIG. 2 is an illustration of a manufacturing environment in accordance with an illustrative embodiment.

With reference now to FIG. 2, an illustration of a manufacturing environment is depicted in accordance with an illustrative embodiment. Manufacturing environment 200 is an example of an environment in which a component of aircraft 100 in FIG. 1 is laid up. For example, stringer 201 is a component of aircraft 100; however, it should be understood that the systems and methods described herein can be used to manufacture any component that is formed from a plurality of charges.

Charge shaping system 202 is used to form a component, such as stringer 201. Charge shaping system 202 includes a plurality of towers 212, a plurality of placement end effectors 214, and a contoured transfer tool 204, wherein each of the plurality of placement end effectors 214 is associated with one tower of the plurality of towers 212, as described in more detail below. Stringer 201 is formed by laying up a plurality of charges (such as plurality of charges 303 of FIG. 3) on tool 204. Composite charge 225 is one of the plurality of charges.

Each of plurality of placement end effectors 214 has sensors so that the placement of composite charge 225 within each respective end effector is known. The placement of composite charge 225 within each respective end effector is used in combination with the locations of plurality of placement end effectors 214 to position composite charge 225 desirably on tool 204.

Tool 204 has surface 205 with a contour corresponding to a desired contour of the component being manufactured. The contour is depicted as contour 504 in FIG. 5. Tool 204 is referred to as a contoured transfer tool or a contoured tool herein. Each charge of the plurality of charges is placed onto tool 204 against surface 205 or previous charges to form stringer 201.

At least one charge of the plurality of charges is cut from ply stack 206. Ply stack 206 is a stack of a plurality of plies having any desirable number of plies. The plurality of plies in ply stack 206 forms at least a portion of stringer 201. Further, ply stack 206 includes plies that have any desirable number of ply angles. Each ply in ply stack 206 has any desirable shape. Each ply in ply stack 206 has any desirable placement. In some illustrative examples, the shape and placement of plies in ply stack 206 create a number of ply drops.

At least one charge of the plurality of charges is cut from ply stack 206 using cutting system 208. Cutting system 208 is any desirable type of system, such as a laser cutting system, a blade cutting system, or any other desirable type of cutting system. In some illustrative examples, cutting system 208 takes the form of an ultrasonic knife. As depicted, cutting system 208 is part of a cutting table. After being cut, at least one charge is removed from ply stack 206 using pick and place system 210.

Pick and place system 210 transfers each of the plurality of charges to charge shaping system 202. Charge shaping system 202 includes plurality of towers 212, plurality of placement end effectors 214, and tool 204. Each of plurality of placement end effectors 214 is associated with one of plurality of towers 212. Plurality of placement end effectors 214 places a charge of the plurality of charges onto tool 204 to form stringer 201. Charge shaping system 202 contours each of the plurality of charges to tool 204 using plurality of placement end effectors 214. Each of plurality of placement end effectors 214 is connected to a respective tower of plurality of towers 212 using a respective extension of plurality of extensions 216.

In some illustrative examples, roller 218 is part of charge shaping system 202. As depicted, roller 218 is connected to a moveable structure other than plurality of towers 212. In another illustrative example, roller 218 is connected to one tower of plurality of towers 212. In yet another example, roller 218 is connected to a robotic structure, such as a robotic arm.

As depicted, plurality of towers 212 includes six towers. Plurality of towers 212 has any desirable quantity of towers. The quantity is selected based on at least one of the contour of tool 204, the length of stringer 201, the type of composite material in stringer 201, or the quantity of plies in each of the plurality of charges. For example, the quantity of plurality of towers 212 is selected based on the flexibility of the plurality of charges which is influenced by the type of composite material and quantity of plies in each of the plurality of charges.

Plurality of towers 212 has a spacing between the towers. In some illustrative examples, the spacing is substantially the same between each of plurality of towers 212. For example, the spacing between first tower 220 and second tower 222 is the same as the spacing between second tower 222 and third tower 224. In other examples, the spacing is different between towers in plurality of towers 212 or is different between pairs of towers 212. For example, the spacing is different between first tower 220 and second tower 222 than the spacing between second tower 222 and third tower 224.

In some illustrative examples, the spacing between plurality of towers 212 is selected in accordance with properties of a charge to be contoured. Further, the spacing between plurality of towers 212 may be changed between contouring charges. In some examples, the spacing between plurality of towers 212 is changed based on a length of a respective charge, a thickness of a respective charge, a material of a respective charge, or other features of the charge. For example, the spacing between plurality of towers 212 is selected to reduce or prevent sagging of the respective charge. Thus, in some illustrative examples, the spacing between plurality of towers 212 is changed between contouring charges.

Plurality of placement end effectors 214 is used to place the plurality of charges to form stringer 201. Plurality of placement end effectors 214 is also referred to as a plurality of placement end effectors herein.

As depicted, charge shaping system 202 is holding composite charge 225 with respect to tool 204. Charge shaping system 202 contours and then centers composite charge 225 relative to tool 204. Each end effector of plurality of placement end effectors 214 retains composite charge 225 while contouring and centering composite charge 225 relative to tool 204. One end effector of plurality of placement end effectors 214 retains composite charge 225 by applying pressure to composite charge 225. When applying pressure to composite charge 225, composite charge 225 may not slip relative to the end effector. The end effector of plurality of placement end effectors 214 that applies pressure to composite charge 225 is any desirable end effector of plurality of placement end effectors 214. For example, end effector 226 has a pressure pad in this illustrative example. As a result, in some illustrative examples, end effector 226 is the one end effector of plurality of placement end effectors 214 that applies pressure to composite charge 225. In these illustrative examples, other end effectors of plurality of placement end effectors 214 retain composite charge 225 while allowing composite charge 225 to slip relative to the end effectors as composite charge 225 is contoured on surface 205 of tool 204.

In another illustrative example, the end effector of plurality of placement end effectors 214 that applies pressure to composite charge 225 is end effector 230. In some illustrative examples, each of plurality of placement end effectors 214 has a pressure pad. Thus any end effector of plurality of placement end effectors 214 may be selected to apply pressure to composite charge 225 or any subsequent charge. In some illustrative examples, different end effectors of plurality of placement end effectors 214 are used to apply pressure to different charges. An end effector of plurality of placement end effectors 214 selected to apply pressure to a charge is based on properties of the respective charge. For example, a respective end effector of plurality of placement end effectors 214 is selected to apply pressure to a respective charge based on the length of the charge.

The end effector of plurality of placement end effectors 214 that applies pressure to composite charge 225 is the end effector associated with a first end of composite charge 225. Thus, the respective end effector applying pressure to composite charge 225, positions the first end of composite charge 225 relative to tool 204. The respective end effector applying pressure to composite charge 225 moves towards or away from a respective tower to position the first end of composite charge 225 relative to the width of tool 204. However, in some examples, the first end of composite charge 225, while held by the respective end effector with pressure, may not be in a desirable location along the length of tool 204. In these examples, the respective tower associated with the respective end effector is moved relative to tool 204 to position the first end of composite charge 225 relative to the length of tool 204.

In the depicted example, the respective end effector is end effector 226. End effector 226 moves towards or away from tower 220 to position a first end of composite charge 225 relative to the width of tool 204. Tower 220 moves along the length of tool 204 to position the first end of composite charge 225 relative to the length of tool 204. The position of the first end of composite charge 225 is determined based on the location of end effector 226 relative to tool 204 and the location of charge 225 within end effector 226. A number of sensors associated with end effector 226 determine at least one of the location of end effector 226 relative to tool 204 or the location of charge 225 within end effector 226.

By the remaining end effectors of plurality of placement end effectors 214 allowing composite charge 225 to slip relative to the remaining end effectors, composite charge 225 slips during contouring. After contouring composite charge 225, plurality of placement end effectors 214 then center composite charge 225 relative to tool 204.

By allowing composite charge 225 to slip relative to all but one end effector of plurality of placement end effectors 214, inconsistencies in stringer 201 are reduced or prevented. Only one end effector of plurality of placement end effectors 214 doesn't allow composite charge 225 to slip during contouring. In some illustrative examples, the majority of end effectors in plurality of placement end effectors 214 allow for composite charge 225 to slip during contouring. In some illustrative examples, end effector 226 does not allow composite charge 225 to slip during contouring.

During contouring, each end effector of plurality of placement end effectors 214 is moved independently. For example, each end effector of plurality of placement end effectors 214 that is moved up and down on a respective tower of plurality of towers 212 is moved up and down independently. As another example, each of plurality of placement end effectors 214 that is angled relative to tool 204 is angled independently using a respective rotation mechanism of a plurality of rotation mechanisms. An example of one of the plurality of rotation mechanisms is rotation mechanism 608 of end effector 226 shown in FIG. 6.

Although each end effector of plurality of placement end effectors 214 moves independently, the plurality of placement end effectors 214 act in concert to contour composite charge 225. By acting in concert the plurality of placement end effectors 214 contour composite charge 225 without distortion.

After contouring composite charge 225, plurality of placement end effectors 214 then center composite charge 225 relative to tool 204. Each end effector of plurality of placement end effectors 214 may move towards or away from its respective tower of plurality of towers 212 to center composite charge 225. In one illustrative example, the end effector applying pressure to composite charge 225 prior to contouring centers composite charge 225 relative to tool 204 prior to contouring. In this illustrative example, the remaining end effectors center composite charge 225 relative to tool 204 prior to contouring.

Centering composite charge 225 includes at least one of positioning the remaining end effectors of plurality of placement end effectors 214 relative to tool 204 or pulling respective top plates of the remaining end effectors towards each respective tower of plurality of towers 212. In some illustrative examples, the remaining end effectors are positioned relative to tool 204 such that the remaining end effectors are centered relative to tool 204 prior to contouring. In these illustrative examples, following contouring, respective top plates of the remaining end effectors are pulled towards each respective tower of plurality of towers 212 to restrain composite charge 225 between a respective flange and a respective stop of each remaining end effector. By pulling the respective top plates of the remaining end effectors, composite charge 225 is centered relative to tool 204.

After positioning a charge relative to tool 204 using plurality of placement end effectors 214, roller 218 compacts composite charge 225 onto tool 204. As roller 218 approaches each end effector of plurality of placement end effectors 214, a respective upper plate of the end effector retaining composite charge 225 is rotated up and the lower plate is slid out while the roller maintains the charge's centerline in the process.

After compacting a charge with roller 218, an additional charge (such as another charge of plurality of charges 303 shown in FIG. 3) is placed onto tool 204 using charge shaping system 202 until all desirable charges have been placed. When the width of the additional charge is different from the width of the previous charge, the gap between upper plate stop and the lower plate stop will be adjusted to maintain centerline for the additional charge on plurality of placement end effectors 214.

As depicted, movement system 227 is associated with tool 204. Although as depicted movement system 227 takes the form of a wheel system, movement system 227 may take any desirable form such as a rail system, legs, or other desirable type of movement system. When desirable, tool 204 is moved away from the other components of charge shaping system 202 using movement system 227 to make space for another tool to be positioned with respect to plurality of towers 212.

Control system 228 may include of a set of controllers. In this illustrative example, each controller of the set of controllers in control system 228 may be implemented using software, hardware, firmware, or a combination thereof. When software is used, the operations performed by the controller may be implemented using, for example, without limitation, program code configured to run on a processor unit. When firmware is used, the operations performed by the controller may be implemented using, for example, without limitation, program code and data and stored in persistent memory to run on a processor unit.

When hardware is employed, the hardware may include one or more circuits that operate to perform the operations performed by the controller(s). Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations and/or processes performed by the controller(s) may be performed using organic components integrated with inorganic components. In some cases, the operations and/or processes may be performed by entirely organic components, excluding a human being. As one illustrative example, circuits in organic semiconductors may be used to perform these operations and/or processes.

In these illustrative examples, one or more controller of the set of controllers that form control system 228 is associated with one or more components of charge shaping system 202. In some illustrative examples, one or more of the set of controllers that form control system 228 is associated with at least one of plurality of placement end effectors 214, a plurality of rotation mechanisms (such as rotation mechanism 608 shown in FIG. 6), or a plurality of motors.

The illustration of manufacturing environment 200 in FIG. 2 is not meant to imply physical or architectural limitations to the manner in which an illustrative embodiment is implemented. Other components in addition to or in place of the ones illustrated may be used. Some components may be unnecessary. For example, although plurality of towers 212 is depicted as having six towers, plurality of towers 212 may have any desirable quantity of towers. In one example, plurality of towers 212 has fewer than six towers. In another example, plurality of towers 212 has more than six towers.

As an additional example, pick and place system 210 may be any desirable type of system. In one example, pick and place system 210 is instead a gantry system. When pick and place system 210 is a gantry system, a series of vacuum cups pick up a charge and shuttle it to charge shaping system 202.

In a further example, roller 218 is associated with a movement system. As a result, roller 218 is positioned in any desirable position using the movement system such that roller 218 does not interfere with pick and place system 210.

As another example, although not depicted in FIG. 2, plurality of towers 212 may be connected to a number of movement systems (such as a movement system having components similar to the components of movement system 227). In these examples, the number of movement systems allows for movement of plurality of towers 212 relative to each other. Accordingly, this number of movement systems enables modification of the spacing of plurality of towers 212. Further, the number of movement systems allows for modifying the quantity of plurality of towers 212. The number of movement systems allows for addition or removal of towers from plurality of towers 212 depending on a desired quantity of plurality of placement end effectors 214. The quantity of plurality of placement end effectors 214 is selected based on at least one of the composite material, the quantity of plies in each charge of the plurality of charges, or the size of tool 204.

As yet a further example, although composite charge 225 is depicted as extending the full length of tool 204, in some illustrative examples at least one charge of the plurality of charges does not extend the full length of tool 204. In one example, composite charge 225 instead extends less than the full length of tool 204. For charges extending less than the full length of tool 204, only a portion of plurality of placement end effectors 214 is used to contour the charges. Further, in some illustrative examples, the spacing between the portion of plurality of placement end effectors 214 is changed based on the length of the respective charge.

Figure 4:
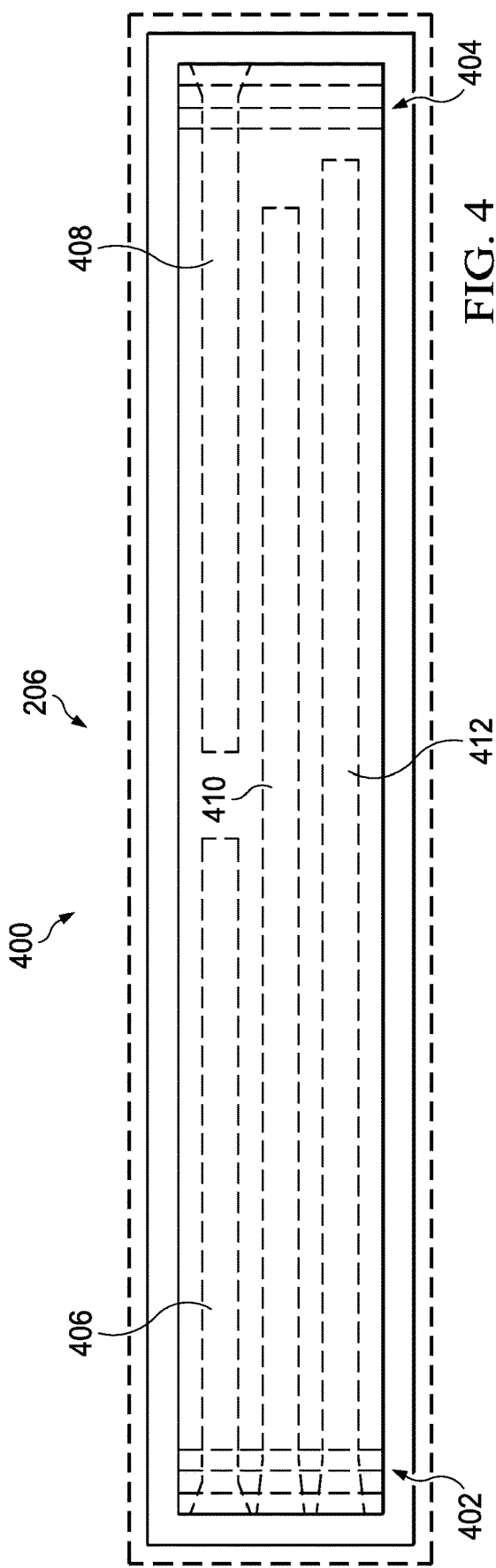
FIG. 4 is an illustration of a ply stack in accordance with an illustrative embodiment.

As an example, the respective lengths of first charge 406 and second charge 408 of ply stack 206 shown in FIGS. 2 and 4 are less than the length of tool 204. Accordingly, only a portion of plurality of placement end effectors 214 is used to contour first charge 406 or second charge 408.

When a respective charge does not extend the full length of tool 204, the respective charge may start at any desirable point on tool 204. For example, each charge need not extend to an end of tool 204. Instead, at least one charge begins on a location of tool 204 other than an end of tool 204.

As yet a further example, although composite charge 225 and stringer 201 are depicted as substantially "flat," at least one of composite charge 225 or stringer 201 may be "twisted" in alternate examples. A charge may be "twisted" when at least one extension is not substantially perpendicular to a respective tower. To desirably position a charge when the stringer is twisted, a movement system associated with a tower and an extension changes the angle of the extension relative to the tower. In this example, each tower of plurality of towers 212 is associated with a respective movement system to change an angle of a respective extension of plurality of extensions 216 relative to the respective tower. Which movement systems are used to change angles of the extensions is dependent on the location of the twisting, the number of twists, and other desirable properties of the resulting stringer.

Figure 3:
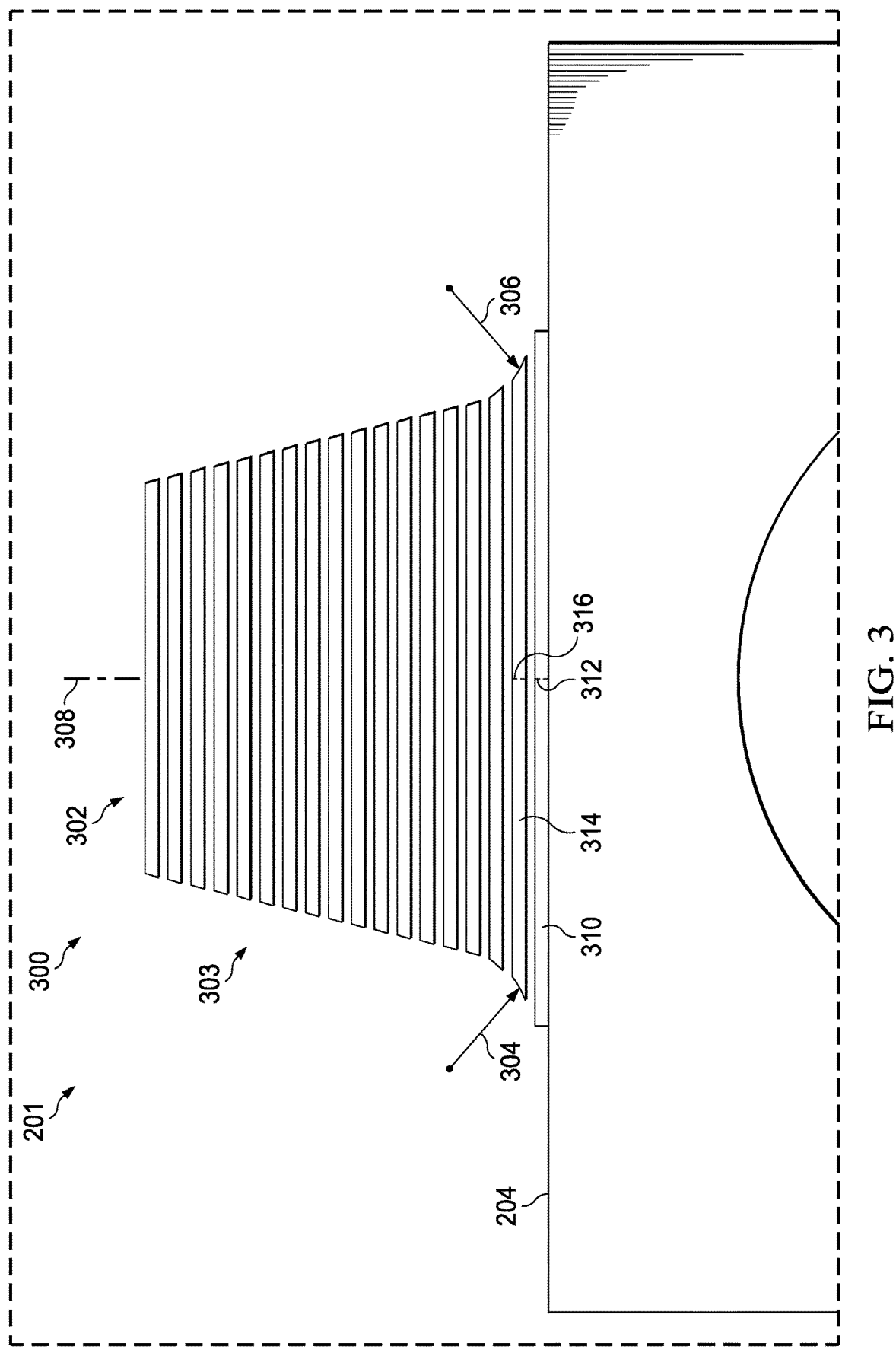
FIG. 3 is an illustration of a stringer in accordance with an illustrative embodiment.

Turning now to FIG. 3, an illustration of a stringer is depicted in accordance with an illustrative embodiment. View 300 is a front view of stringer 201 of FIG. 2. Stringer 201 is a component of aircraft 100 of FIG. 1. Charge shaping system 202 of FIG. 2 is used to form stringer 201. In this view, the length of stringer 201 extends into and out of the page.

Stringer 201 is formed of plurality of plies 302. Plurality of plies 302 is formed of a composite material. As depicted, plurality of plies 302 forms plurality of charges 303. Stringer 201 is formed by laying down each of plurality of charges 303 in sequence. Each charge of plurality of charges 303 has a different width. The decreasing widths of plurality of charges 303 form first radius 304 and second radius 306.

Although each charge of plurality of charges 303 is depicted with a common thickness, this is provided only as a simple non-limiting illustration. Each charge of plurality of charges 303 is formed using any desirable number of plies. Each charge of plurality of charges 303 includes one or more plies As described herein, plurality of charges 303 includes first charge 310 and second charge 314. First charge 310 includes a first number of plies. The first number of plies is one or more plies. As depicted, the edges of first charge 310 are substantially perpendicular. Accordingly, each ply of first charge 310 has substantially the same width. First charge 310 is cut using a desirable cutting system, such as cutting system 208, to form the substantially perpendicular edges.

Second charge 314 includes a second number of plies. The second number of plies is one or more plies. As depicted, second charge 314 has radiused edges. Second charge 314 is cut from a ply stack, such as ply stack 206, using a desirable cutting system to form the radiused edges. As a result of being cut, the second number of plies has different widths. Although second charge 314 is described as having radiused edges, in some examples, second charge 314 instead has angled edges or perpendicular edges.

Composite charge 225 (shown in FIG. 2) is one of plurality of charges 303. Each charge of plurality of charges 303 includes a number of plies of plurality of plies 302. As used herein, "a number of," when used with reference to items, means one or more items. For example, "a number of plies" includes one or more plies. Each charge in plurality of charges 303 is also referred to as a composite charge herein. Plurality of charges 303 includes composite charge 225 (shown in FIG. 2).

Each charge of plurality of charges 303 has a respective shape and centerline. Each shape is a three dimensional shape including at least one of the two-dimensional shape of each ply of plurality of plies 302 and the location of each ply of plurality of plies 302 present in the respective charge. In some illustrative examples, a respective shape further includes a contour of a respective charge of plurality of charges 303. A centerline of a respective charge of plurality of charges 303 runs along the length of stringer 201.

Stringer 201 has centerline 308. Each of plurality of charges 303 has a respective centerline within a desired tolerance of centerline 308. For example, first charge 310 has first centerline 312, which is within a desired tolerance of centerline 308. As another example, second charge 314 has second centerline 316, which is within a desired tolerance of centerline 308.

Each of plurality of charges 303 is centered relative to tool 204 using plurality of placement end effectors 214 so that each of plurality of charges 303 is within a desired tolerance of centerline 308. In some illustrative examples, at least one end effector of plurality of placement end effectors 214 centers a portion of a respective charge prior to contouring the charge. In some illustrative examples, at least one end effector of plurality of placement end effectors 214 centers a portion of a respective charge after contouring the charge.

Stringer 201 may also be referred to as a stack stringer. Stringer 201 may have fewer manufacturing steps and/or less manufacturing time than conventional stringers. Further, stringer 201 has a cross-section that cannot be formed using conventional techniques.

Turning now to FIG. 4, an illustration of a ply stack is depicted in accordance with an illustrative embodiment. View 400 is a top view of ply stack 206 of FIG. 2. Ply stack 206 is used to form at least one charge of stringer 201 of FIGS. 2 and 3.

Ply stack 206 includes a plurality of plies forming a number of ply drops. In this illustrative example, the number of ply drops includes ply drop 402 and ply drop 404. The plurality of plies in ply stack 206 form at least a portion of plurality of plies 302 of FIG. 3. Ply stack 206 includes any desirable number of plies. Any desirable number of charges is cut from ply stack 206. In this view, four charges that will be cut out of ply stack 206 are depicted. For example, first charge 406, second charge 408, third charge 410, and fourth charge 412 will be cut from ply stack 206. Plurality of charges 303 of FIG. 3 may include at least one of first charge 406, second charge 408, third charge 410, or fourth charge 412.

After cutting a respective charge from ply stack 206, it is removed by a pick and place system, such as pick and place system 210 of FIG. 2. The pick and place system transfers the respective charge to a charge shaping system.

Figure 5:
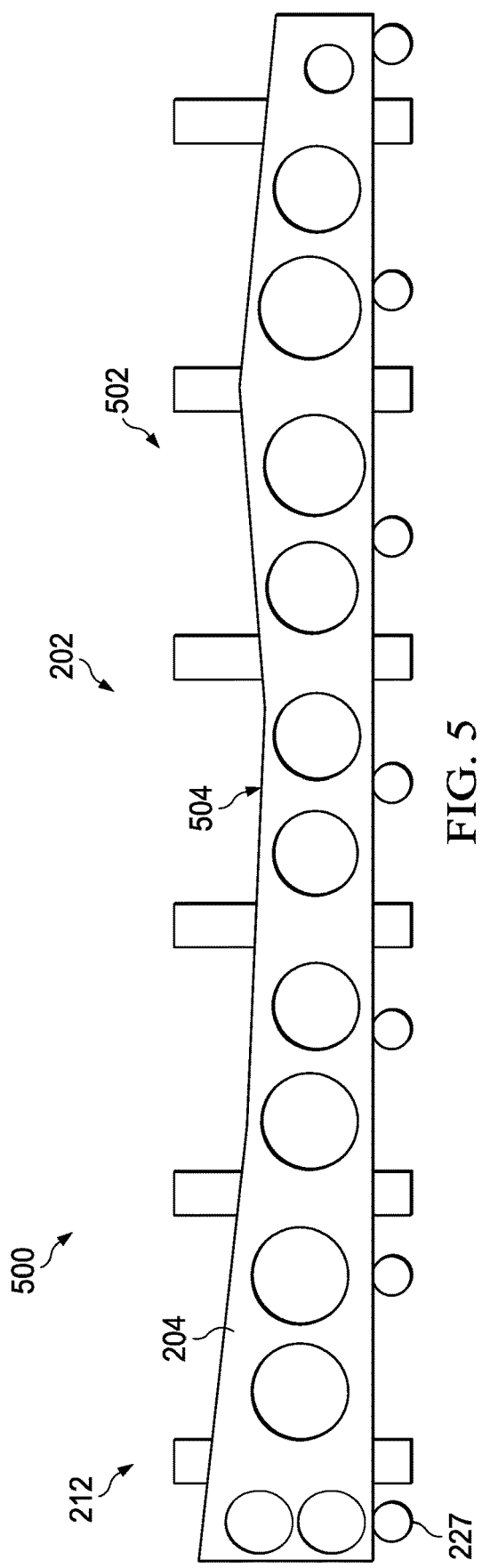
FIG. 5 is an illustration of a ply stack in accordance with an illustrative embodiment.

Turning now to FIG. 5, an illustration of a side view of a charge shaping system is depicted in accordance with an illustrative embodiment. View 500 is a side view of charge shaping system 202 of FIG. 2. Charge shaping system 202 is used to form stringer 201 of FIGS. 2 and 3.

Charge shaping system 202 includes plurality of towers 212. In this illustrative example, plurality of towers 212 includes six towers. Further, as depicted, spacing 502 between plurality of towers 212 is substantially uniform.

In some illustrative examples, spacing 502 between plurality of towers 212 is set based on properties of composite charge 225. For example, spacing 502 between plurality of towers 212 is set based on at least one of a length of composite charge 225, a thickness of composite charge 225, a material of composite charge 225, or other features of composite charge 225. For example, spacing 502 between plurality of towers 212 is selected to reduce or prevent sagging of composite charge 225. Sagging of composite charge 225 is influenced by the stiffness of composite charge 225. Stiffness of composite charge 225 is affected by the number of plies in composite charge 225.

Tool 204 has contour 504. Composite charges, such as plurality of charges 303 shown in FIG. 3, are shaped to contour 504 to form a stringer, such as stringer 201 shown in FIGS. 2 and 3. In view 500, movement system 227 is associated with tool 204. In this illustrative example, movement system 227 takes the form of a wheel system. Since tool 204 is associated with movement system 227, tool 204 is moved away from charge shaping system 202 to make room for another tool when desirable.

Figure 6:
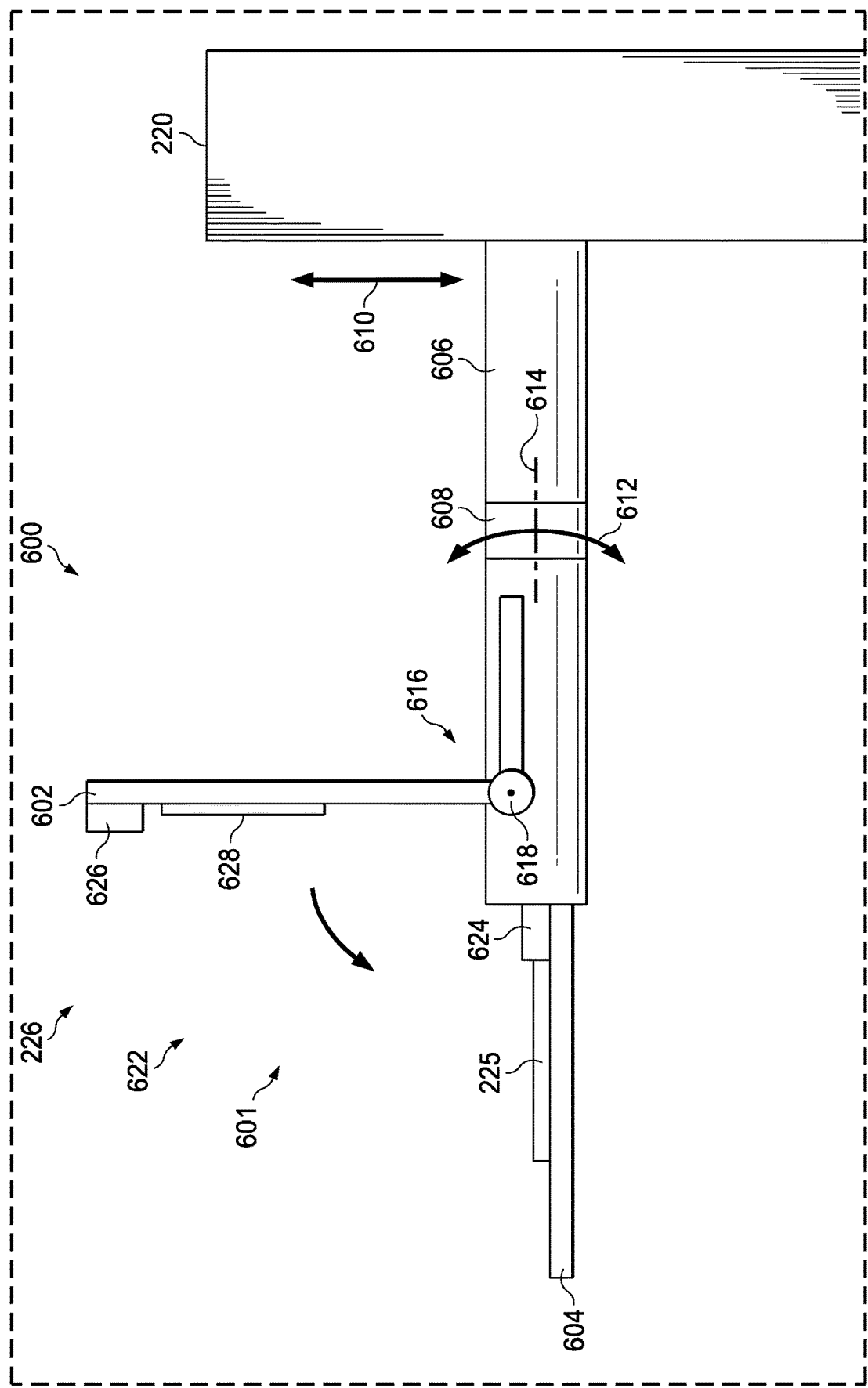
FIG. 6 is an illustration of a side view of an end effector and a tower in accordance with an illustrative embodiment.

Turning now to FIG. 6, an illustration of a side view of an end effector and a tower is depicted in accordance with an illustrative embodiment. View 600 is a view of any of plurality of placement end effectors 214 of FIG. 2. For example, view 600 may be a view of end effector 226 of FIG. 2. End effector 226 is used to form a component of aircraft 100 of FIG. 1. End effector 226 is used to form stringer 201 of FIGS. 2 and 3. End effector 226 is a portion of charge shaping system 202 of FIG. 2.

Apparatus 601 depicted in view 600 includes end effector 226. End effector 226 includes upper plate 602 and lower plate 604. End effector 226 is connected to extension 606 by rotation mechanism 608. In some illustrative examples, extension 606 may also be referred to as an arm. In some illustrative examples, rotation mechanism 608 may also be referred to as a wrist. Extension 606 is connected to first tower 220. Extension 606 is associated with a number of motors (not depicted) to move extension 606 in direction 610 relative to first tower 220. By moving extension 606 relative to first tower 220, end effector 226 is also moved relative to first tower 220 in direction 610.

Rotation mechanism 608 rotates end effector 226 in direction 612 about second axis 614. By rotating end effector 226 about second axis 614, end effector 226 is angled relative to a tool, such as tool 204 shown in FIG. 2.

Plate movement system 616 rotates upper plate 602 relative to lower plate 604 about first axis 618 that extends into and out of the page. By rotating upper plate 602 about first axis 618, upper plate 602 will cover composite charge 225. Thus, apparatus 601 is said to include extension 606, rotation mechanism 608 attached to extension 606 and rotatable about second axis 614, lower plate 604 associated with rotation mechanism 608, and upper plate 602 rotatable relative to lower plate 604 relative to first axis 618.

In some illustrative examples, end effector 226 is representative of each of plurality of placement end effectors 214. In these examples, each of plurality of placement end effectors 214 comprises a lower plate 604, an upper plate 602 rotatable relative to the lower plate 604 about a first axis 618, and a rotation mechanism 608 rotatable about a second axis 614. In some examples, each of the plurality of placement end effectors 214 further comprises a plate movement system 616 configured to pull the upper plate 602 towards the rotation mechanism 608. In one example, a pressure pad 628 is associated with the upper plate 602 of a first end effector of the plurality of placement end effectors 214.

As depicted, upper plate 602 is in first position 622. In first position 622, upper plate 602 is out of the way for placement of composite charge 225 on lower plate 604. By rotating upper plate 602 about first axis 618, upper plate 602 is placed into a second position shown in FIG. 7.

Figure 7:
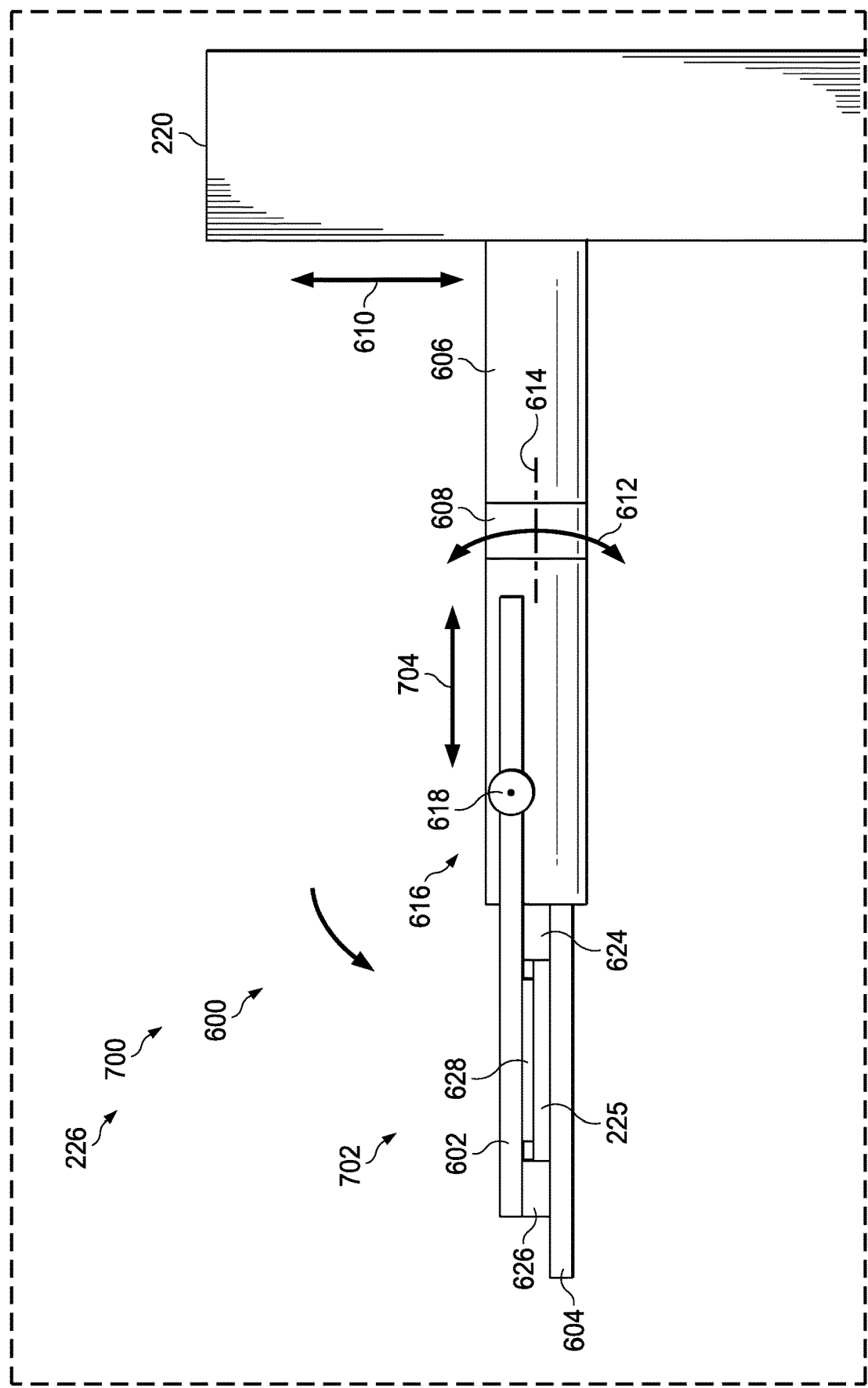
FIG. 7 is an illustration of a side view of an end effector in accordance with an illustrative embodiment.

In this illustrative example, stop 624 is associated with lower plate 604. When stop 624 is associated with lower plate 604, stop 624 is used to center composite charge 225. Stop 624 is only one example of a stop. In some illustrative examples, stop 624 is an optional component. In another illustrative example, stop 624 is replaceable with a stop of a different size. Flange 626 and pressure pad 628 are associated with upper plate 602. Stop 624 and flange 626 are used to position composite charge 225 on lower plate 604 as depicted in FIG. 7. In some illustrative examples, upper plate 602 is rotatable from a first position 622 to a second position 702, and a flange 626 associated with upper plate 602 contacts a lower plate 604 in the second position 702 of FIG. 7. Flange 626 helps retain composite charge 225 in end effector 226.

Although view 600 is described as depicting end effector 226, view 600 may instead show end effector 230 of FIG. 2. In some other illustrative examples, view 600 may show another end effector other than end effector 226 or end effector 230.

Although not depicted in FIG. 6, end effector 226 may include any desirable number of sensors. For example, at least one sensor may be associated with end effector 226 so that a placement of composite charge 225 on lower plate 604 is determined. As another example, at least one sensor may be associated with lower plate 604 to determine a location of end effector 226 relative to tool 204.

Turning now to FIG. 7, an illustration of a side view of an end effector is depicted in accordance with an illustrative embodiment. View 700 is a view of end effector 226 with upper plate 602 in second position 702. Upper plate 602 rotates relative to lower plate 604 to place upper plate 602 in second position 702. As depicted, first position 622 is approximately 90 degrees from second position 702. However, the difference between first position 622 and second position 702 is any desirable value. To rotate upper plate 602 from first position 622 to second position 702, plate movement system 616 rotates upper plate 602 about first axis 618. In view 700, composite charge 225 rests on lower plate 604 between stop 624 and flange 626 of upper plate 602 contacting lower plate 604.

To restrain composite charge 225 on lower plate 604, plate movement system 616 pulls upper plate 602 in direction 704 towards rotation mechanism 608. By pulling upper plate 602 in direction 704 towards rotation mechanism 608, both stop 624 and flange 626 contact composite charge 225. By pulling upper plate 602 in direction 704, plate movement system 616 centers composite charge 225 between stop 624 and flange 626 on lower plate 604.

After restraining composite charge 225 using stop 624 and flange 626, pressure pad 628 is used to hold composite charge 225 against lower plate 604. Pressure pad 628 is activated when end effector 226 is associated with a beginning of composite charge 225. When pressure pad 628 is activated, no other pressure pad associated with plurality of placement end effectors 214 will be activated. For example, if pressure pad 628 of end effector 226 is activated, an associated pressure pad of end effector 230 is not activated. By only activating one pressure pad, composite charge 225 slips relative to the other end effectors of plurality of placement end effectors 214. By only activating pressure pad 628, composite charge 225 is held at one end of composite charge 225 and the remainder of composite charge 225 slips relative to the remaining end effectors of plurality of placement end effectors 214.

In one illustrative example, end effector 226 having pressure pad 628 centers composite charge 225 prior to contouring composite charge 225. In this illustrative example, end effector 226 contours composite charge 225 while pressure pad 628 is activated. In some illustrative examples, end effector 226 is the only end effector of plurality of placement end effectors 214 that centers composite charge 225 prior to contouring. The remaining end effectors of plurality of placement end effectors 214 center composite charge 225 after contouring composite charge 225.

For the remaining end effectors of plurality of placement end effectors 214, the respective stops and respective flanges do not restrain composite charge 225 prior to contouring. In these illustrative examples, composite charge 225 does not contact the respective stops and respective flanges prior to contouring. After contouring, the respective top plates are pulled toward respective towers to restrain composite charge 225 relative to all end effectors of plurality of placement end effectors 214. In some examples, at least one of the remaining end effectors is centered relative to tool 204 after contouring composite charge 225.

Although pressure pad 628 is present in this illustrative example, pressure pads are optional in some end effectors of plurality of placement end effectors. In some illustrative examples, end effector 226 is the only end effector in a charge shaping system shown in FIG. 2 to have a pressure pad. In these illustrative examples, the remaining end effectors of plurality of placement end effectors 214 are substantially the same as end effector 226 but without pressure pad 628.

When only end effector 226 has pressure pad 628, plurality of placement end effectors 214 move relative to tool 204 so that pressure pad 628 holds an end of a charge. For example, some charges have a length less than tool 204. When a charge is positioned at a location other than a first end of tool 204, end effector 226 is moved relative to tool 204 to place the respective charge onto the location.

In some other illustrative examples, each of plurality of placement end effectors 214 has a pressure pad. However, only one end effector of plurality of placement end effectors 214 will activate its respective pressure pad to restrain composite charge 225. When each of plurality of placement end effectors 214 has a respective pressure pad, which pressure pad is activated is decided based on the length of the respective charge. For example, for a charge shorter than the total length of tool 204, an end effector other than end effector 226 has an activated pressure pad. In one illustrative example, the length of composite charge 225 is approximately half the length of tool 204. In this illustrative example, end effector 230 activates its respective pressure pad.

The end effector having the activated pressure pad may also be referred to as the "first end effector." The word "first" in "first end effector" should not be taken to indicate any specific location of the first end effector within plurality of placement end effectors 214. The first end effector is any desirable end effector within plurality of placement end effectors 214. The first end effector is the only end effector of plurality of placement end effectors 214 to restrain composite charge 225 between a respective flange and a respective stop prior to contouring composite charge 225. The remaining end effectors of plurality of placement end effectors 214 holding composite charge 225 will restrain composite charge 225 between respective flanges and respective stops after contouring composite charge 225.

Figure 8:
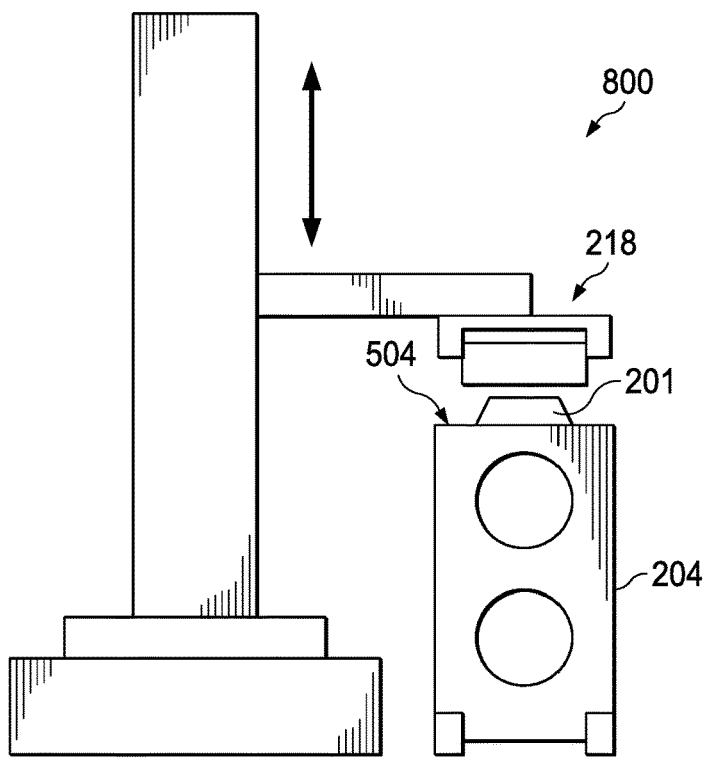
FIG. 8 is an illustration of a front view of a roller in a charge shaping system in accordance with an illustrative embodiment.

Turning now to FIG. 8, an illustration of a front view of a roller in a charge shaping system is depicted in accordance with an illustrative embodiment. View 800 is a view of charge shaping system 202 from direction labeled FIG. 8 in FIG. 2. When plurality of placement end effectors 214 have a composite charge, such as composite charge 225, positioned relative to tool 204, roller 218 is used to compact the charge to tool 204 or previously laid down charges. In this illustrative example, roller 218 compacts the charge to the tool or previously laid down charges to form stringer 201.

Roller 218 starts applying pressure to the charge after the end effector having the activated pressure pad. For example, roller 218 starts applying pressure to the charge after end effector 226. In these illustrative examples, end effector 226 has the activated pressure pad. In some illustrative examples, an end effector other than end effector 226 has an activated pressure pad. For example, end effector 230 may have an activated pressure pad.

By applying pressure after the end effector with the activated pressure pad, roller 218 tacks composite charge 225 in place. In some illustrative examples, roller 218 moves towards the end effector having the activated pressure pad first. In these illustrative examples, roller 218 secures the start of composite charge 225. Afterwards, roller 218 moves along the remaining length of composite charge 225.

In these illustrative examples, pressure pad 628 of end effector 226 is deactivated and upper plate 602 is rotated up. Lower plate 604 is next slid out from under composite charge 225 and roller 218 is rolled under pressure towards end effector 226 and the start of composite charge 225. On completion, roller 218 is rolled under pressure to just before the next end effector of plurality of placement end effectors 214. There, the respective upper plate is rotated up and the respective lower plate is slid out from under composite charge 225. The roller continues on under pressure to the next end effector. The process is repeated until the end of the charge is reached.

In other illustrative examples, roller 218 moves away the end effector having the activated pressure pad first. In these illustrative examples, roller 218 secures the length of composite charge 225 prior to securing the start of composite charge 225. In these illustrative examples, roller 218 starts applying pressure to the charge while the pressure pad is still active. When the pressure pad is still active, the charge is kept from moving in the spanwise direction during rolling.

As roller 218 moves across contour 504 of tool 204, the upper plate of the next end effector (not depicted) is rotated before the roller passes by. The lower plate of the next end effector is also extracted by sliding out from under the charge via the arm just before the roller passes by. In these illustrative examples, after compacting the charge along tool 204, the pressure pad on the first end effector is released. Roller 218 then compacts the remainder of the charge.

The different components shown in FIG. 1 and FIGS. 3-8 may be combined with components in FIG. 2, used with components in FIG. 2, or a combination of the two. Additionally, some of the components in FIGS. 3-8 may be illustrative examples of how components shown in FIG. 2 may be implemented as physical structures.

Figure 9:
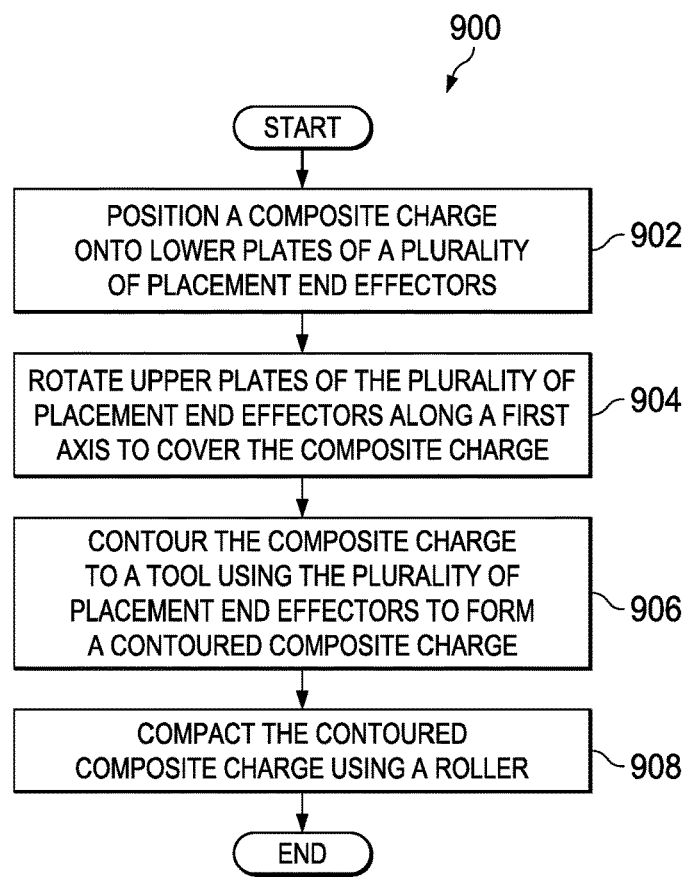
FIG. 9 is an illustration of a flowchart of a method for forming a contoured composite charge in accordance with an illustrative embodiment.

Turning now to FIG. 9, an illustration of a flowchart of a method for forming a contoured composite charge is depicted in accordance with an illustrative embodiment. In the following description, method 900 is described as using the end effector 226 of views 600 and 700, but it should be understood that the description also applies to using other desirable end effectors of plurality of placement end effectors 214, such as end effector 230 or any other desirable end effector. Further, in the following description, method 900 may apply to using end effectors of any other desirable designs.

Referring to FIGS. 2-9, method 900 begins by positioning a composite charge 225 onto lower plates 604 of a plurality of placement end effectors 214 (operation 902). Method 900 then rotates upper plate 602 of the plurality of placement end effectors 214 along a first axis 618 to cover the composite charge 225 (operation 904). In some illustrative examples, rotating upper plate 602 of the plurality of placement end effectors 214 along the first axis 618 to cover the composite charge 225 allows the composite charge 225 to slip between all but one of the upper plate 602 and respective lower plate 604 of the plurality of placement end effectors 214 during contouring.

Method 900 contours the composite charge 225 to a tool 204 using the plurality of placement end effectors 214 to form a contoured composite charge (operation 906). In some illustrative examples, contouring the composite charge 225 includes rotating a rotation mechanism 608 of a first end effector of the plurality of placement end effectors 214 along a second axis 614, wherein the first axis 618 is perpendicular to the second axis 614. In some illustrative examples, contouring the composite charge 225 to a tool 204 using the plurality of placement end effectors 214 to form a contoured composite charge comprises moving each of the plurality of placement end effectors 214 relative to the tool 204 independent of each other end effector of the plurality of placement end effectors 214. Although movement of each of the plurality of placement end effectors 214 is independent, the plurality of placement end effectors 214 work in concert to contour the composite charge 225. In other words, each end effector of plurality of placement end effectors 214 performs its own movements towards a common goal of contouring composite charge 225. In some illustrative examples, moving each of the plurality of placement end effectors 214 relative to the tool 204 independent of each other end effector of the plurality of placement end effectors 214 includes rotating each of the plurality of placement end effectors 214 independently using a respective rotation mechanism 608.

Method 900 compacts the contoured composite charge using a roller 218 (operation 908). In some illustrative examples, compacting the contoured composite charge forms a plank stringer. In some illustrative examples, the contoured composite charge is compacted onto one of a second composite charge or the tool 204.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In one example, method 900 further comprises activating a pressure pad 628 of a first upper plate 602 to restrain the composite charge 225 relative to the first upper plate 602 and a respective first lower plate 604. In another example, method 900 further comprises centering the contoured composite charge 225 to form a centered contoured composite charge prior to compacting. Centering the contoured composite charge 225 to form a centered contoured composite charge comprises at least one of positioning the remaining end effectors of plurality of placement end effectors 214 relative to tool 204 or pulling respective top plates of the remaining end effectors towards each respective tower of plurality of towers 212. The remaining end effectors of plurality of placement end effectors 214 are the end effectors of plurality of placement end effectors 214 contacting composite charge 225 other than the first end effector.

As another example, method 900 further comprises pulling a first upper plate of the upper plates 602 towards a first tower 220 holding a respective end effector 226 of the plurality of placement end effectors 214 having the first upper plate 602, wherein pulling the first upper plate 602 towards the first tower 220 restrains the composite charge 225 on the respective end effector 226. In yet another example, method 900 further comprises cutting the composite charge from a ply stack 206 having plies with different orientations. In some examples, the composite charge 225 has a number of ply drops 402 and 404 incorporated in the ply stack 206. In an example, method 900 further comprises forming the ply stack 206 by laying up a plurality of plies, wherein forming the ply stack 206 includes forming a number of ply drops 402 and 404.

Figure 10:
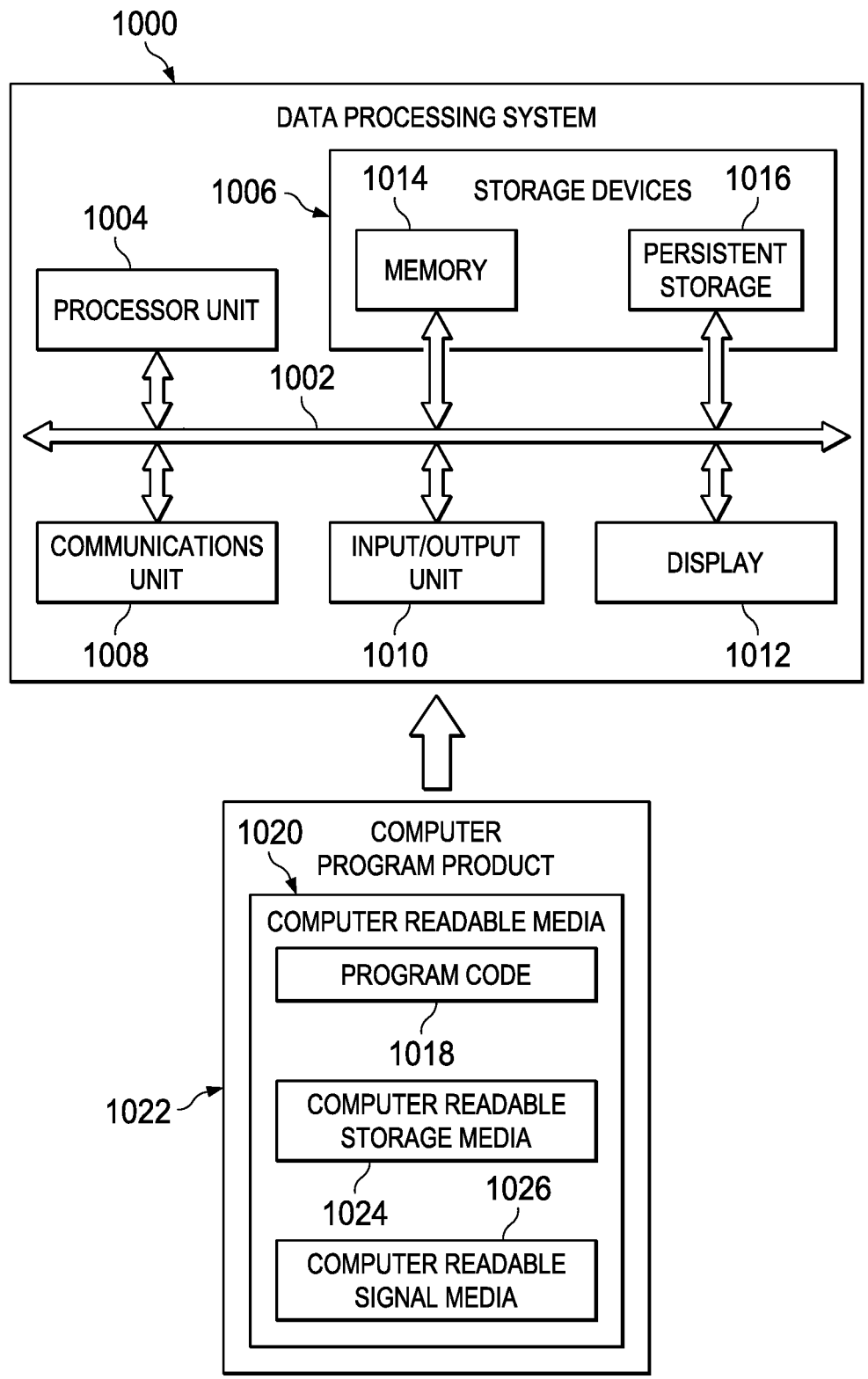
FIG. 10 is an illustration of a data processing system in the form of a block diagram in accordance with an illustrative embodiment.

Turning now to FIG. 10, an illustration of a data processing system in the form of a block diagram is depicted in accordance with an illustrative embodiment. Data processing system 1000 may be used to implement at least one of control system 228 in FIG. 2 or one or more of a set of controllers (not depicted) to control components in FIGS. 4-8. As depicted, data processing system 1000 includes communications framework 1002, which provides communications between processor unit 1004, storage devices 1006, communications unit 1008, input/output unit 1010, and display 1012. In some cases, communications framework 1002 may be implemented as a bus system.

Processor unit 1004 is configured to execute instructions for software to perform a number of operations. Processor unit 1004 may comprise a number of processors, a multi-processor core, and/or some other type of processor, depending on the implementation. In some cases, processor unit 1004 may take the form of a hardware unit, such as a circuit system, an application specific integrated circuit (ASIC), a programmable logic device, or some other suitable type of hardware unit.

Instructions for the operating system, applications, and/or programs run by processor unit 1004 may be located in storage devices 1006. Storage devices 1006 may be in communication with processor unit 1004 through communications framework 1002. As used herein, a storage device, also referred to as a computer-readable storage device, is any piece of hardware capable of storing information on a temporary and/or permanent basis. This information may include, but is not limited to, data, program code, and/or other information.

Memory 1014 and persistent storage 1016 are examples of storage devices 1006. Memory 1014 may take the form of, for example, a random access memory or some type of volatile or non-volatile storage device. Persistent storage 1016 may comprise any number of components or devices. For example, persistent storage 1016 may comprise a hard drive, a flash memory, a rewritable optical disk, a rewritable magnetic tape, or some combination of the above. The media used by persistent storage 1016 may or may not be removable.

Communications unit 1008 allows data processing system 1000 to communicate with other data processing systems and/or devices. Communications unit 1008 may provide communications using physical and/or wireless communications links.

Input/output unit 1010 allows input to be received from and output to be sent to other devices connected to data processing system 1000. For example, input/output unit 1010 may allow user input to be received through a keyboard, a mouse, and/or some other type of input device. As another example, input/output unit 1010 may allow output to be sent to a printer connected to data processing system 1000.

Display 1012 is configured to display information to a user. Display 1012 may comprise, for example, without limitation, a monitor, a touch screen, a laser display, a holographic display, a virtual display device, and/or some other type of display device.

In this illustrative example, the processes of the different illustrative embodiments may be performed by processor unit 1004 using computer-implemented instructions. These instructions may be referred to as program code, computer usable program code, or computer-readable program code, and may be read and executed by one or more processors in processor unit 1004.

In these examples, program code 1018 is located in a functional form on computer-readable media 1020, which is selectively removable, and may be loaded onto or transferred to data processing system 1000 for execution by processor unit 1004. Program code 1018 and computer-readable media 1020 together form computer program product 1022. In this illustrative example, computer-readable media 1020 may be computer-readable storage media 1024 or computer-readable signal media 1026.

Computer-readable storage media 1024 is a physical or tangible storage device used to store program code 1018 rather than a medium that propagates or transmits program code 1018. Computer-readable storage media 1024 may be, for example, without limitation, an optical or magnetic disk or a persistent storage device that is connected to data processing system 1000.

Alternatively, program code 1018 may be transferred to data processing system 1000 using computer-readable signal media 1026. Computer-readable signal media 1026 may be, for example, a propagated data signal containing program code 1018. This data signal may be an electromagnetic signal, an optical signal, and/or some other type of signal that can be transmitted over physical and/or wireless communications links.

The illustration of data processing system 1000 in FIG. 10 is not meant to provide architectural limitations to the manner in which the illustrative embodiments may be implemented. The different illustrative embodiments may be implemented in a data processing system that includes components in addition to or in place of those illustrated for data processing system 1000. Further, components shown in FIG. 10 may be varied from the illustrative examples shown.

Figure 11:
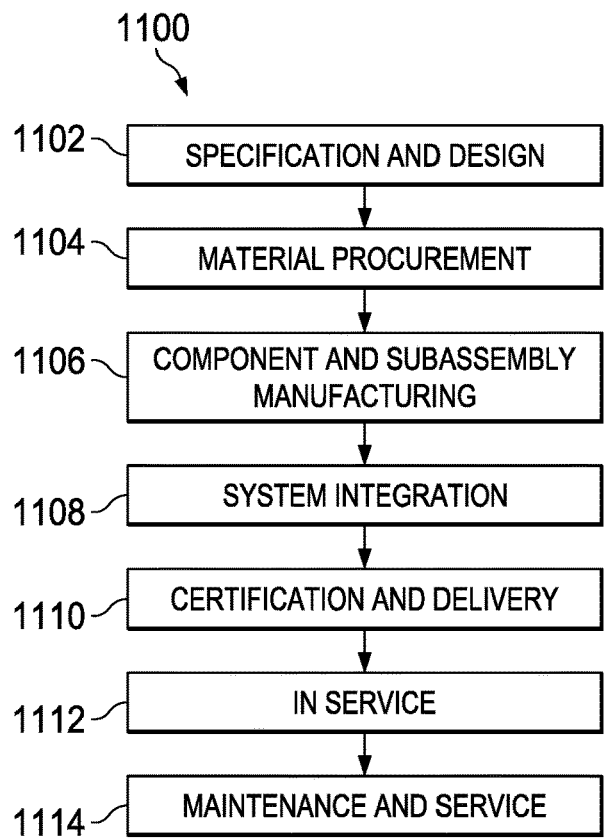
FIG. 11 is an illustration of an aircraft manufacturing and service method in the form of a block diagram in accordance with an illustrative embodiment.
Figure 12:
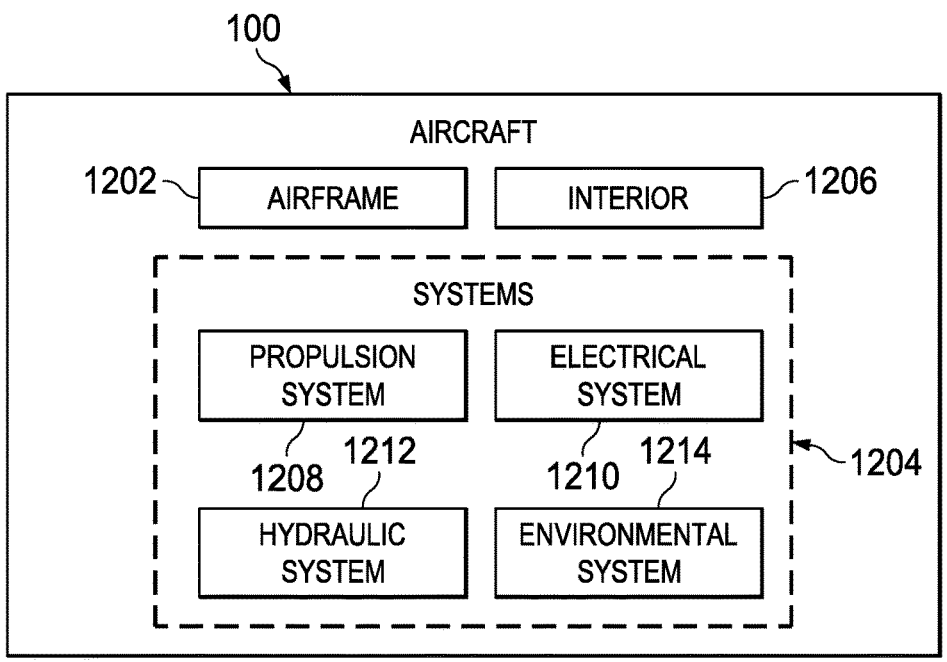
FIG. 12 is an illustration of an aircraft in the form of a block diagram, in which an illustrative embodiment may be implemented.

Illustrative embodiments of the disclosure are described in the context of aircraft manufacturing and service method 1100, as shown in FIG. 11, and aircraft 100, as shown in FIG. 12. Turning first to FIG. 11, an illustration of an aircraft manufacturing and service method is depicted in accordance with an illustrative embodiment. During pre-production, aircraft manufacturing and service method 1100 include specification and design 1102 of aircraft 100 and material procurement 1104.

During production, component and subassembly manufacturing 1106 and system integration 1108 of aircraft 100 take place. Thereafter, aircraft 100 goes through certification and delivery 1110 in order to be placed in service 1112. While in service 1112 by a customer, aircraft 100 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an illustrative embodiment may be implemented. FIG. 12 is a representation of aircraft 100 of FIG. 1 in block diagram format. In this example, aircraft 100 is produced by aircraft manufacturing and service method 1100 in FIG. 11, and includes airframe 1202 with systems 1204 and interior 1206. Airframe 1202 can include at least one component (such as stringer 201) made using the systems, apparatus, and processes described with respect to FIGS. 2-10. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 in FIG. 11. One or more illustrative embodiments may be used during component and subassembly manufacturing 1106 in FIG. 11. For example, charge shaping system 242 in FIG. 2 may be used to create a composite component such as stringer 201 of FIG. 2 during component and subassembly manufacturing 1106. For example, charge shaping system 242 may be used to form a portion of airframe 1202 during component and subassembly manufacturing 1106. Further, charge shaping system 242 in FIG. 2 may be used to create a replacement part for an assembly during maintenance and service 1114 in FIG. 11. In these examples, method 900 may be used to form a composite component or replacement part during component and subassembly manufacturing 1106 or maintenance and service 1114 in FIG. 11.

Thus, one or more illustrative embodiments may provide a method and apparatus for forming a contoured composite charge. A charge shaping system may include a plurality of placement end effectors. The plurality of placement end effectors may be independently moveable in a number of axes relative to a forming tool. For example, each of the plurality of placement end effectors may be moved up or down relative to the tool independently of the remaining end effectors. As another example, each of the plurality of placement end effectors may be angled relative to the tool independently of the remaining end effectors.

The charge shaping system creates a stacked stringer. A stacked stringer includes a plurality of plies of varying width. The varying width generates at least one of a number of radii or a number of angled sides. The cross sectional shape of the stringer is a function of the changing widths of the charges. As a result of the varying widths of the plurality of plies, diverse cross-sectional shapes can be created. The varying widths of the plurality of plies are created by cutting the charges when the plurality of plies are uncured. The cross-sectional shape of the stringer is also controlled by placement of the charges by the plurality of placement end effectors.

A stacked stringer may reduce manufacturing time of composite structures. For example, a stacked stringer does not include any fillers, also referred to as "noodles." By eliminating fillers, manufacturing time may be reduced.

Further, a stacked stringer may be co-cured with a skin. Conventional stringers are cured separately from a skin or other composite components during a separate curing step. By reducing or eliminating separate curing steps, manufacturing time may be reduced. Further, autoclave availability may increase by reducing or eliminating separate curing steps. Yet further, energy costs may be reduced by reducing or eliminating separate curing steps.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A charge shaping system, comprising:
   a plurality of towers;
   a plurality of placement end effectors, wherein each of the plurality of placement end effectors is associated with one of the plurality of towers and wherein each of the plurality of placement end effectors comprises:
   a lower plate;
   an upper plate rotatable relative to the lower plate about a first axis; and
   a rotation mechanism rotatable about a second axis; and
   contoured transfer tool.

2. The charge shaping system of claim 1, wherein each of the plurality of placement end effectors further comprises a plate movement system configured to pull the upper plate towards the rotation mechanism.

3. The charge shaping system of claim 1, wherein a stop is associated with the lower plate.

4. The charge shaping system of claim 3, wherein a composite charge rests on the lower plate between the stop and a flange of the upper plate contacting the lower plate.

5. The charge shaping system of claim 1, further comprising a pressure pad associated with the upper plate of a first end effector of the plurality of placement end effectors.

6. An apparatus comprising:
   an extension;

a rotation mechanism attached to the extension and rotatable about an axis;
a lower plate associated with the rotation mechanism;
an upper plate rotatable relative to the lower plate; and
a pressure pad associated with the upper plate.

7. The apparatus of claim 6, wherein the upper plate is rotatable from a first position to a second position, wherein a flange associated with the upper plate contacts the lower plate when the upper plate is in the second position.

8. The apparatus of claim 6 further comprising a stop associated with the lower plate.

9. An apparatus comprising:
a plurality of placement end effectors, wherein each of the plurality of placement end effectors comprises:
a lower plate configured to hold a composite charge, and
an upper plate rotatable relative to the lower plate to cover the composite charge on the lower plate such that the composite charge is retained between the upper plate and the lower plate; and
wherein one of the plurality of placement end effectors further comprises a pressure pad configured to be activated to restrain the composite charge between the upper plate and the lower plate of the one of the plurality of placement end effectors.

10. The apparatus of claim 9 further comprising a plurality of towers, wherein each of the plurality of placement end effectors is associated with one of the plurality of towers.

11. The apparatus of claim 9, wherein the upper plate of each of the plurality of placement end effectors is rotatable from a first position to a second position, wherein a flange associated with the upper plate of each of the plurality of placement end effectors contacts a corresponding lower plate of each of the plurality of placement end effectors when the upper plate is in the second position.

12. The apparatus of claim 9 further comprising a stop associated with the lower plate of each of the plurality of placement end effectors.

13. The apparatus of claim 9, wherein the pressure pad is associated with the upper plate of the one of the plurality of placement end effectors.

14. The apparatus of claim 9, wherein:
each of the plurality of placement end effectors comprises a pressure pad configured to be activated to restrain the composite charge between a corresponding upper plate and a corresponding lower plate of each of the plurality of placement end effectors; and
the pressure pad for one of the plurality of placement end effectors is configured to be activated to restrain the composite charge between the upper plate of the one of the plurality of placement end effectors and the lower plate of the one of the plurality of placement end effectors while pressure pads for all others of the plurality of placement end effectors are not activated such that the composite charge is allowed to slip between the upper plates and the corresponding lower plates of the others of the plurality of placement end effectors.

15. The apparatus of claim 9, wherein each of the plurality of placement end effectors further comprises:
an extension;
a rotation mechanism attached to the extension and rotatable about an axis; and
wherein the lower plate is associated with the rotation mechanism.

16. The apparatus of claim 9 further comprising a contoured transfer tool.

17. A charge shaping system, comprising:
a plurality of towers;
a plurality of placement end effectors, wherein each of the plurality of placement end effectors is associated with one of the plurality of towers and wherein each of the plurality of placement end effectors comprises:
a lower plate; and
an upper plate that is rotatable from a first position to a second position, wherein a flange associated with the upper plate contacts the lower plate when the upper plate is in the second position; and
contoured transfer tool.

18. The charge shaping system of claim 17, wherein the first position is approximately 90 degrees from the second position.

19. The charge shaping system of claim 17, wherein a stop is associated with the lower plate.

20. The charge shaping system of claim 17, further comprising a pressure pad associated with the upper plate of a first end effector of the plurality of placement end effectors.

* * * * *